United States Patent [19]

Peters

[11] Patent Number: 5,194,524
[45] Date of Patent: Mar. 16, 1993

[54] PROCESS FOR MAKING POLY(CARBONATE-SILOXANES) VIA ALKYL AMINO TERMINATED SILICONES

[75] Inventor: Edward N. Peters, Lenox, Mass.

[73] Assignee: General Electric Company, Pittsfield, Mass.

[21] Appl. No.: 593,704

[22] Filed: Oct. 5, 1990

[51] Int. Cl.[5] .................... C08L 69/00; C08L 83/08
[52] U.S. Cl. .................................. 525/464; 525/467; 528/26; 528/29; 528/38
[58] Field of Search ............... 525/464, 467; 528/38, 528/26, 29; 556/425

[56] References Cited

U.S. PATENT DOCUMENTS

| | | | |
|---|---|---|---|
| 3,028,365 | 4/1962 | Schnell et al. | 528/196 |
| 3,189,662 | 6/1965 | Vaughn | 528/33 |
| 3,275,601 | 9/1966 | Schnell et al. | 528/199 |
| 3,661,964 | 5/1972 | Griffith et al. | 528/29 |
| 3,989,672 | 11/1976 | Vestergaard | 528/199 |
| 4,198,468 | 4/1980 | Molari | 428/412 |
| 4,198,498 | 4/1980 | LeGrand et al. | 528/38 |
| 4,606,933 | 8/1986 | Griswold et al. | 427/54.1 |
| 4,645,614 | 2/1987 | Goossens et al. | 252/75 |
| 4,695,612 | 9/1987 | Takekoshi et al. | 525/433 |

Primary Examiner—Ralph H. Dean, Jr.
Attorney, Agent, or Firm—Gary L. Loser

[57] ABSTRACT

A process is provided for making poly(carbonate-siloxanes). The process involves melt mixing polycarbonate resin and an amount of a secondary amine functional siloxane to produce a polycarbonate-siloxane copolymer. The process is useful for producing a copolymer resin that can be used as resin for making molded articles.

12 Claims, No Drawings

PROCESS FOR MAKING POLY(CARBONATE-SILOXANES) VIA ALKYL AMINO TERMINATED SILICONES

BACKGROUND OF THE INVENTION

1. Field of the Invention

The present invention relates to processes for making poly(carbonate-siloxane) copolymers, and more particularly relates to a process for making poly(carbonate-siloxane) copolymers by reacting polycarbonate resin and a secondary amine functional siloxane.

2. Description of Related Art

Poly(siloxane-carbonate) copolymers have been made by reacting in the presence of an acid acceptor, a mixture of halogen chain-stopped polydiorganosiloxane and a dihydric phenol and thereafter phosgenating the reaction product until the desired copolymer is obtained (See Molari, U.S. Pat. No. 4,198,468 and Vaughn, Jr., U.S. Pat. No. 3,189,662) While the above procedure provides poly(siloxane-carbonate) copolymers, a need exists for a simplified procedure for producing poly(siloxane-carbonate) copolymers.

Accordingly, a procedure is provided for producing poly(carbonate-siloxane) copolymers by reacting an aromatic polycarbonate resin and a secondary amine functional siloxane.

SUMMARY OF THE INVENTION

The present invention involves a process for producing a polycarbonate-siloxane copolymer by reacting an aromatic polycarbonate resin and a secondary amine functional siloxane.

DETAILED DESCRIPTION OF THE INVENTION

The process involves mixing aromatic carbonate polymers and a secondary amine functional siloxane.

The aromatic carbonate polymers of the instant invention are known compounds and have recurring units of the formula:

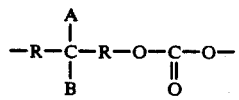

(I)

wherein each —R— is selected from the group consisting of phenylene, halo-substituted phenylene and alkyl substituted phenylene; and A and B are each selected from the group consisting of hydrogen, hydrocarbon radicals, free from aliphatic unsaturation and of radicals which together with the adjoining

(II)

atom form a cycloalkane radical, the total number of carbon atoms in A and B being up to 12.

These aromatic carbonate polymers may be prepared by methods well known in the art and described in U.S. Pat. Nos. 3,989,672; 3,275,601; and 3,028,365; all of which are incorporated herein by reference.

In the practice of this invention, any of the aromatic polycarbonates can be employed herein. However, particularly useful are the aromatic polycarbonates prepared by reacting a dihydric phenol, such as bisphenol-A (2,2-bis(4-hydroxyphenyl)propane) with a carbonate precursor. Typical of some of the dihydric phenols that may be employed in the practice of this invention are bis(4-hydroxyphenyl)methane, 2,2-bis(4-hydroxyphenyl)propane, 2,2-bis(4-hydroxy-3-methylphenyl)propane, 4,4-bis-(4-hydroxyphenyl)heptane, 2,2-(3,5,3',5'-tetrabromo-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane. Other dihydric phenols of the bisphenol type are also available and are disclosed in U.S. Pat. Nos. 2,999,835; 3,028,365; and 3,334,154.

In addition, the reaction is carried out with the carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

The secondary amine functional siloxane is a secondary amine containing polydiorganosiloxane preferably represented by the formula:

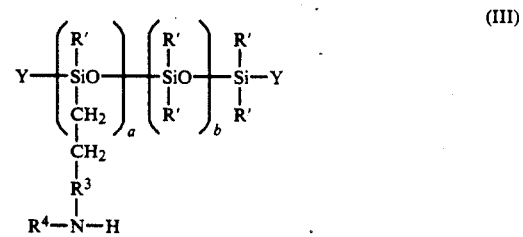

(III)

wherein each Y is independently selected from members of the group of monovalent radicals consisting of alkyl radicals, hydroxy radicals, alkoxy radicals; wherein R' and R$^4$ are each members independently selected from the group consisting of monovalent hydrocarbon radicals and halogenated monovalent hydrocarbon radicals. R' and R$^4$ may each be independently selected from the group consisting of aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc. R$^3$ is a member selected from the group consisting of divalent hydrocarbon radicals and halogenated divalent hydrocarbon radicals. R$^3$ may be selected from the group consisting of arylene radicals and halogenated arylene radicals such as phenylene, chlorophenylene, xylylene, tolylene, etc.; aralkylene radicals such as phenylethylene, benzylene, etc.; aliphatic, haloaliphatic and cycloaliphatic radicals such as alkylene, alkenylene, cycloalkylene, haloalkylene including methylene, ethylene, propylene, chlorobutylene, cyclohexylene, etc. "a" preferably represents from 1 to 4, more preferably "a" is selected from the whole numbers 1 and 2; and "b" preferably represents from 4 to 200, more preferably from about 15 to about 90, inclusive, while the ratio of "a" to "b" is preferably from about 0.05 to 0.10.

The secondary amine functional siloxane can be made by reacting (i) a halogenated polydiorganosiloxane of the formula:

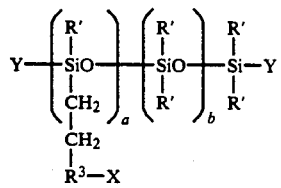 (IV)

wherein R', R³, a, b and Y are defined above and X is a halogen, preferably chlorine, with (ii) a primary amine terminated hydrocarbon of the formula:

 (V)

wherein R⁴ is defined above. A suitable primary amine terminated hydrocarbon is n-butyl amine CH₃—CH₂—CH₂—CH₂—NH₂. The reaction of the halogenated polydiorganosiloxane with the primary amine terminated hydrocarbon can be achieved by heating a mixture thereof in the presence of excess primary amine terminated hydrocarbon.

The halogenated polydiorganosiloxane may be prepared by reacting a poly(monoorgano/diorgano siloxane) with an aliphatically unsaturated halogenated hydrocarbon in the presence of a platinum catalyst via hydrosilation. The poly(monoorgano/diorgano siloxane) is represented by the formula:

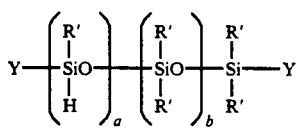 (VI)

wherein R', Y, a, and b are as defined above. The aliphatically unsaturated halogenated hydrocarbon is of the formula:

 (VII)

A suitable aliphatically unsaturated halogenated hydrocarbon is represented by the formula:

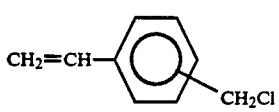 (VIII)

A suitable halogenated polydiorganosiloxane is represented by the formula:

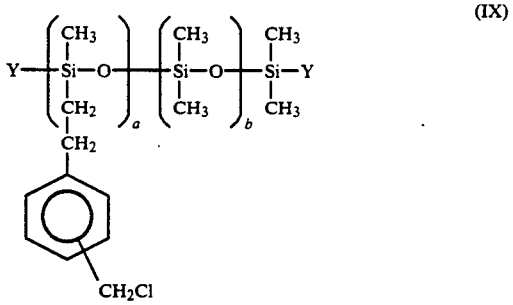 (IX)

A suitable secondary amine functional polydiorganosiloxane is represented by the formula:

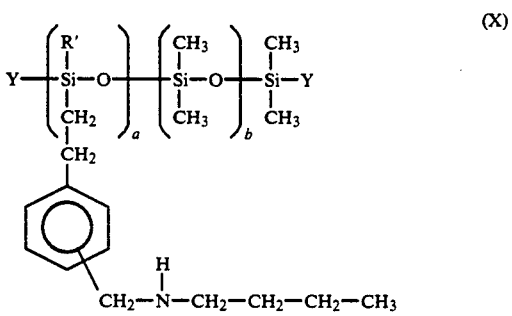 (X)

The secondary amine functional polydiorganosiloxanes have first units of the formula:

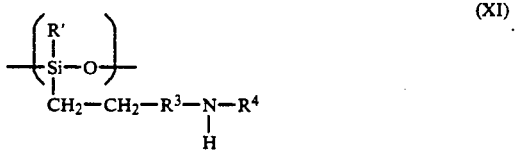 (XI)

and second units of the formula:

 (XII)

wherein the first units are preferably present at a level of from 5 to 10 mole percent based on the total moles of first and second units present in the secondary amine functional polydiorganosiloxane, wherein the second units are preferably present at a level of from 90 to 95 mole percent based on the total moles of first and second units present in the secondary amine functional polydiorganosiloxane.

The process for making the poly(carbonate-soloxane) involves reacting of the aromatic carbonate polymeric resin and the secondary amine terminated siloxane by mixing of the polycarbonate and siloxane at elevated temperatures. The mixing can be achieved in a heated extruder at reaction temperatures of from between 250° C. and 330° C., more preferably between 260° C. and 300° C., most preferably from 265° C. and 280° C.

It is important that the secondary functional polydiorganosiloxane have secondary amine functionality rather than primary amine functionality because the resultant polysiloxanecarbonate would lack hydrolytic stability at processing temperatures above 200° C. if a primary amine functional polydiorganosiloxane were employed. A theory for the primary amine resulting in relatively low hydrolytic stability is that the resultant copolymer having the following molecular moiety would undergo the following cleavage:

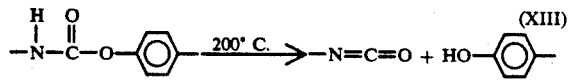
(XIII)

whereas the secondary amine functionality of siloxane used in the process of the present invention results in a polymer having relatively higher hydrolytic stability.

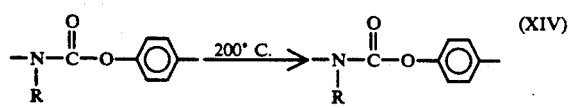
(XIV)

Preferably the secondary amine functional siloxane is free of primary amine groups.

EXAMPLES

The following examples illustrated the process of the present invention but are not meant to limit the scope thereof. The following examples involve obtaining a poly(carbonate-siloxane) by extrusion mixing of aromatic polycarbonate with secondary amine functional polydiorganosiloxane.

EXAMPLE 1

An aromatic polycarbonate derived from bisphenol A and phosgene resulted in a bisphenol A polycarbonate having repeating units of the formula:

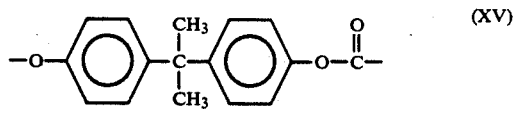
(XV)

was extrusion melt mixed with a secondary amine functional siloxane having the formula:

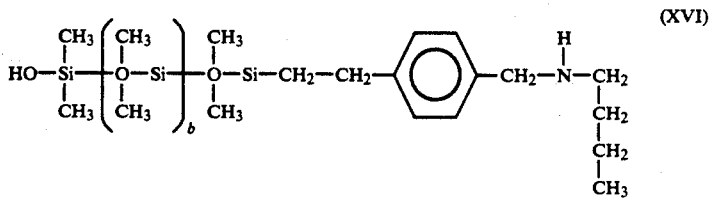
(XVI)

The components were mixed in a WP30 extruder at a temperature of 250° C. to 265° C. and at a mixing rate of 70 rpm. The secondary amine functional silane was present at a level of 3% by weight based on the total weight of the polycarbonate and the siloxane. In Table 1 the resultant polycarbonate siloxane is compared in properties to the properties of the polycarbonate resin that was used as a reactant in the present process. The average value of b is 28.

TABLE 1

| Properties | Aromatic Bisphenol A Polycarbonate | Polycarbonatesiloxane of Example 1 |
|---|---|---|
| Melt flow, g/10 min | 8.2 | 15.3 |
| HDT 2264 PSI, °F. | 270 | 260 |
| VL-94 ⅛" | V-2 | V-0 |
| Notched Izod, ft-lb/in | 16 | 14 |
| Heat Aged 125° C. for 100 hours Notched Izod, ft-lb/in | 2 | 13 |

Melt flow is measured by ASTM D1238; HDT is measured at 264 PSI in °F. by ASTM D648; UL-94 was evaluated for ⅛" thick test samples; Notched Izod is measured in ft-lb/in by Underwriters Bulleting 94; Intrinsic Viscosity was determined in methylene chloride at 25° C.; Flexural Strength was determined by ASTM D790; Flexural Modulus was determined by ASTM D790.

The aromatic bisphol-A type polycarbonate used in Example 1 was melt extruded with 3% by weight of secondary amine function siloxane of the formula:

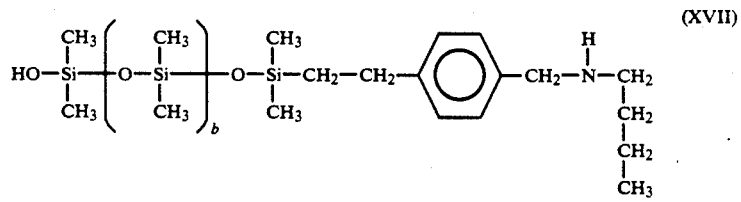
(XVII)

at temperature of 250° C. to 265° C. at an rpm of 70 on a WP30 extruder. The average value of b was 8.

TABLE 2

| Properties | Polycarbonatesiloxane of Example 2 |
|---|---|
| IV | 0.39 DL/G |
| HDT 264 PSI | 242° F. |
| Flexural Strength | 139,000 PSI |
| Flexural Modulus | 348,000 PSI |
| Notched Izod | 2 ft-lbs/in |
| Gardner Impact | >320 in-lbs |

What is claimed:

1. A process for producing a poly(carbonate-siloxane), said process comprising reacting secondary amine functional siloxane with aromatic carbonate polymer.

2. The process of claim 1 wherein said siloxane is free of primary amine groups.

3. The process of claim 1 wherein said process comprises extrusion mixing of said siloxane with said aromatic carbonate polymer.

4. The process of claim 3 wherein said mixing is done at a temperature ranging from 250° C. to 330° C.

5. The process of claim 3 wherein said siloxane is free of primary amine groups.

6. The process of claim 3 wherein said siloxane is present at a level ranging from 0.1% to 30.0% by weight based on the total weight of said siloxane and said aromatic carbonate polymer.

7. A process for producing a poly(carbonate-siloxane), said process comprising reacting a secondary amine functional siloxane with an aromatic carbonate polymer, said secondary amine functional siloxane comprising units of the formula:

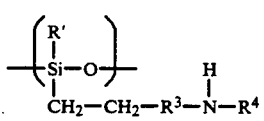

wherein R' is a monovalent hydrocarbon radical, wherein $R^3$ is a divalent hydrocarbon radical, and $R^4$ is a monovalent hydrocarbon radical; and said aromatic carbonate comprising units of the formula:

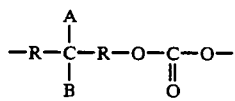

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

8. The process of claim 7 wherein said siloxane is present at a level of form 0.1% to 30.0% by weight based on the total weight of siloxane and aromatic carbonate polymer.

9. The process of claim 8 wherein said aromatic carbonate polymer is derived from bisphenol A and phosgene.

10. The process of claim 9 wherein R' is methyl.

11. A process for producing a poly(carbonate-siloxane), said process comprising reacting (i) a secondary amine functional siloxane of the formula:

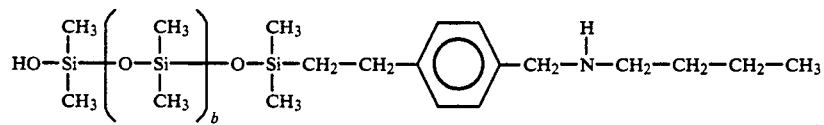

wherein b is a number ranging from between 4 to 90, with (ii) an aromatic carbonate polymer.

12. The process of claim 11 wherein said aromatic carbonate polymer has repeating units of the formula:

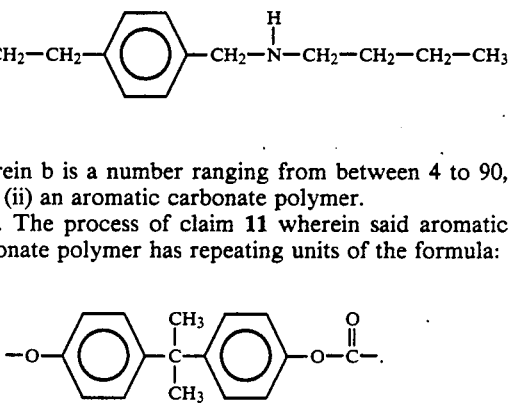

* * * * *